United States Patent
Hsieh et al.

(10) Patent No.: US 10,721,102 B2
(45) Date of Patent: Jul. 21, 2020

(54) COMMUNICATION APPARATUS AND COMMUNICATION METHOD

(71) Applicant: Realtek Semiconductor Corporation, Hsinchu (TW)

(72) Inventors: Kai-An Hsieh, Tainan (TW); Yi-Chun Hsieh, Miaoli (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/043,572

(22) Filed: Jul. 24, 2018

(65) Prior Publication Data
US 2019/0068412 A1 Feb. 28, 2019

(30) Foreign Application Priority Data

Aug. 28, 2017 (TW) .............................. 106129204 A

(51) Int. Cl.
*H04L 25/03* (2006.01)
*H04B 1/10* (2006.01)

(52) U.S. Cl.
CPC ..... *H04L 25/03057* (2013.01); *H04B 1/1036* (2013.01); *H04L 2025/0349* (2013.01); *H04L 2025/03369* (2013.01)

(58) Field of Classification Search
None
See application file for complete search history.

(56) References Cited

U.S. PATENT DOCUMENTS

| 4,085,368 | A | * | 4/1978 | Yeh | ........................... H04L 1/06 375/332 |
| 4,468,786 | A | | 8/1984 | Davis | |
| 4,995,031 | A | * | 2/1991 | Aly | ....................... H04B 3/235 370/286 |

(Continued)

FOREIGN PATENT DOCUMENTS

EP 1783908 A2 * 5/2007 ............... H03K 3/84

OTHER PUBLICATIONS

Agrawal et al., A 19-Gbs Serial Link Receiver With Both 4-Tap FFE and 5-Tap DFE Functions in 45-nm SOI CMOS, in IEEE Journal of Solid-State Circuits, vol. 47, No. 12, pp. 3220-3231 (Cited in the Applicant's IDS of Jul. 24, 2018).*

(Continued)

*Primary Examiner* — Berhanu Tadese
(74) *Attorney, Agent, or Firm* — Locke Lord LLP; Tim Tingkang Xia, Esq.

(57) ABSTRACT

A communication apparatus includes an input terminal, an output terminal, and an interference reduction circuit. The interference reduction circuit is coupled between the input terminal and the output terminal. The interference reduction circuit receives a time-varying data signal. The interference reduction circuit acquires first partial data from the data signal at a first time, and generates a first level-shifted result and a second level-shifted result according to the first partial data. The interference reduction circuit is further configured to acquire second partial data from the data signal at a second time. The interference reduction circuit selects one of the first level-shifted result and the second level-shifted result as a selected result according to the second partial data, and sends the selected result to the output terminal.

20 Claims, 10 Drawing Sheets

(56) References Cited

U.S. PATENT DOCUMENTS

| | | | | |
|---|---|---|---|---|
| 5,748,070 A * | 5/1998 | Priebe | G06F 7/02 | 327/53 |
| 5,748,686 A * | 5/1998 | Langberg | H04H 20/46 | 370/515 |
| 5,751,506 A * | 5/1998 | Amada | G11B 20/10009 | 360/51 |
| 5,815,529 A * | 9/1998 | Wang | H04H 20/46 | 375/285 |
| 6,078,444 A * | 6/2000 | Vishakhadatta | G11B 5/012 | 341/155 |
| 6,172,970 B1 * | 1/2001 | Ling | H04B 7/0814 | 370/347 |
| 6,552,565 B2 * | 4/2003 | Chang | H04L 25/0278 | 326/30 |
| 6,650,624 B1 * | 11/2003 | Quigley | H04J 3/1694 | 370/252 |
| 6,823,483 B1 * | 11/2004 | Creigh | G01R 31/3004 | 375/219 |
| 6,865,234 B1 * | 3/2005 | Agazzi | G01R 31/3004 | 341/103 |
| 6,904,110 B2 * | 6/2005 | Trans | H04B 1/00 | 375/229 |
| 6,961,314 B1 * | 11/2005 | Quigley | H04J 3/0682 | 370/252 |
| 6,965,616 B1 * | 11/2005 | Quigley | H04J 3/0682 | 370/480 |
| 6,993,673 B2 * | 1/2006 | Greiss | H04B 1/0003 | 375/229 |
| 7,092,684 B2 * | 8/2006 | Szopko | H04B 1/0475 | 455/114.2 |
| 7,103,065 B1 * | 9/2006 | Quigley | H04L 1/0003 | 370/465 |
| 7,120,123 B1 * | 10/2006 | Quigley | H04J 3/0682 | 370/252 |
| 7,139,283 B2 * | 11/2006 | Quigley | H04J 3/1694 | 370/432 |
| 7,242,712 B1 * | 7/2007 | Katic | H04L 25/03057 | 375/233 |
| 7,277,516 B2 * | 10/2007 | Chou | H04L 25/03885 | 375/350 |
| 7,277,725 B1 * | 10/2007 | Henry | H04B 1/525 | 455/296 |
| 7,292,629 B2 * | 11/2007 | Zerbe | H04B 1/1081 | 375/229 |
| 7,466,182 B2 * | 12/2008 | Wang | H04L 25/0264 | 327/333 |
| 7,512,154 B2 * | 3/2009 | Quigley | H04L 1/0003 | 370/468 |
| 7,519,082 B2 * | 4/2009 | Quigley | H04L 1/0003 | 370/468 |
| 7,701,292 B2 * | 4/2010 | Lin | H03G 3/001 | 330/282 |
| 7,821,954 B2 * | 10/2010 | Quigley | H04L 1/0003 | 370/252 |
| 7,843,847 B2 * | 11/2010 | Quigley | H04L 1/0003 | 370/252 |
| 8,107,573 B2 * | 1/2012 | Chang | H04L 25/4919 | 375/317 |
| 8,315,300 B2 * | 11/2012 | Pozzoni | H04L 25/0307 | 375/233 |
| 8,457,190 B2 * | 6/2013 | Raghavan | H04L 25/03057 | 375/233 |
| 8,483,080 B2 * | 7/2013 | Quigley | H04L 1/0003 | 370/252 |
| 8,755,428 B2 * | 6/2014 | Agrawal | H04L 27/01 | 375/229 |
| 8,913,655 B2 * | 12/2014 | Agrawal | H04L 27/01 | 375/229 |
| 8,964,826 B2 * | 2/2015 | Agrawal | H04L 27/01 | 375/230 |
| 9,301,310 B2 * | 3/2016 | Quigley | H04L 1/0003 | |
| 9,553,745 B2 * | 1/2017 | Zerbe | H04L 1/0026 | |
| 9,681,456 B2 * | 6/2017 | Son | H04L 27/2613 | |
| 10,003,484 B2 * | 6/2018 | Zerbe | H04L 1/0026 | |
| 2001/0055319 A1 * | 12/2001 | Quigley | H04L 1/0003 | 370/480 |
| 2002/0037028 A1 * | 3/2002 | Baltersee | H04B 1/7085 | 375/148 |
| 2002/0122480 A1 * | 9/2002 | Abnous | H04L 25/03197 | 375/233 |
| 2003/0016770 A1 * | 1/2003 | Trans | H04L 1/0054 | 375/346 |
| 2003/0086515 A1 * | 5/2003 | Trans | H04B 1/00 | 375/346 |
| 2003/0182619 A1 * | 9/2003 | Greiss | H04L 25/14 | 714/798 |
| 2004/0001427 A1 * | 1/2004 | Belotserkovsky | H04L 25/03159 | 370/208 |
| 2004/0022311 A1 * | 2/2004 | Zerbe | H04L 7/0331 | 375/229 |
| 2005/0134307 A1 * | 6/2005 | Stojanovic | H04L 25/4906 | 326/31 |
| 2005/0186933 A1 * | 8/2005 | Trans | H04B 1/00 | 455/296 |
| 2005/0271173 A1 * | 12/2005 | Chou | H04L 25/03038 | 375/350 |
| 2006/0098986 A1 * | 5/2006 | Jung | H04B 10/66 | 398/140 |
| 2007/0036176 A1 * | 2/2007 | Quigley | H04L 27/2601 | 370/468 |
| 2007/0086484 A1 * | 4/2007 | Quigley | H04L 1/203 | 370/468 |
| 2007/0109995 A1 * | 5/2007 | Quigley | H04L 5/1446 | 370/329 |
| 2007/0230640 A1 * | 10/2007 | Bryan | H04L 25/03057 | 375/349 |
| 2008/0022179 A1 * | 1/2008 | Lee | H04L 25/0288 | 714/748 |
| 2009/0010320 A1 * | 1/2009 | Hollis | H03K 3/356113 | 375/232 |
| 2010/0104000 A1 * | 4/2010 | Pozzoni | H04L 25/03885 | 375/233 |
| 2010/0135372 A1 * | 6/2010 | Agazzi | H04L 25/03146 | 375/219 |
| 2011/0026423 A1 * | 2/2011 | Quigley | H04L 27/2601 | 370/252 |
| 2012/0027074 A1 * | 2/2012 | Raghavan | H04L 25/10 | 375/233 |
| 2012/0044984 A1 * | 2/2012 | Zerbe | H04L 7/0337 | 375/233 |
| 2012/0207196 A1 * | 8/2012 | Zerbe | H04L 1/0026 | 375/219 |
| 2013/0208779 A1 * | 8/2013 | Agrawal | H03K 5/135 | 375/232 |
| 2013/0208782 A1 * | 8/2013 | Agrawal | H04L 25/03878 | 375/233 |
| 2013/0214865 A1 * | 8/2013 | Bulzacchelli | H03F 3/195 | 330/261 |
| 2013/0294377 A1 * | 11/2013 | Quigley | H04L 1/0009 | 370/329 |
| 2013/0336378 A1 * | 12/2013 | Agrawal | H03K 5/135 | 375/233 |
| 2016/0127155 A1 * | 5/2016 | Johnson | H04L 25/03878 | 375/233 |
| 2016/0164745 A1 * | 6/2016 | Quigley | H04L 1/203 | 370/252 |
| 2016/0191276 A1 * | 6/2016 | Sakai | H04L 25/03057 | 375/233 |
| 2017/0033707 A1 * | 2/2017 | Nishijima | H02M 1/44 | |
| 2018/0006852 A1 * | 1/2018 | Zerbe | H04L 1/0026 | |
| 2018/0270040 A1 * | 9/2018 | Takaoka | H04L 1/00 | |
| 2018/0343080 A1 * | 11/2018 | Hsieh | H04L 1/0001 | |

(56) References Cited

U.S. PATENT DOCUMENTS

2019/0068412 A1* 2/2019 Hsieh ............... H04L 25/03057
2019/0129913 A1* 5/2019 Shibayama ........... G06F 17/142

OTHER PUBLICATIONS

Beukema et al., A 6.4-Gbs CMOS SerDes core with feed-forward and decision-feedback equalization, in IEEE Journal of Solid-State Circuits, vol. 40, No. 12, pp. 2633-2645, Dec. 2005 (Cited in the Applicant's IDS of Jul. 24, 2018).*
Jeong et al., Cochannel Interference Reduction in Dynamic-TDD Fixed Wireless Applications, Using Time Slot Allocation Algorithms, IEEE, vol. 50, No. 10, Oct. 2002, pp. 1627-1636.*
V. Stojanovic et al., "Adaptive equalization and data recovery in a dual-mode (PAM2/4) serial link transceiver," 2004 Symposium on VLSI Circuits. Digest of Technical Papers (IEEE Cat. No. 04CH37525), Honolulu, HI, USA, 2004, pp. 348-351.*
Jeong et al., Cochannel Interference Reduction in Dynamic-TDD Fixed Wireless Applications, Using Time Slot Allocation Algorithms, IEEE, vol. 50, No. 10, Oct. 2002, pp. 1627-1636 (Year: 2002).*
Agrawal et al., A 19-Gbs Serial Link Receiver With Both 4-Tap FFE and 5-Tap DFE Functions in 45-nm SOI CMOS, in IEEE Journal of Solid-State Circuits, vol. 47, No. 12, pp. 3220-3231, Dec. 2012 (Year: 2012).*
V. Stojanovic et al., Adaptive equalization and data recovery in a dual-mode (PAM2-4) serial link transceiver, IEEE 2004, pp. 348-351. (Year: 2004).*
A 6.4-Gb/s CMOS SerDes Core With Feed-Forward and Decision-Feedback Equalization, IEEE Journal of Solid-State Circuits, 2005, vol. 40, No. 12.
A 19-Gb/s Serial Link Receiver With Both 4-Tape FFE and 5-Tap DFE Functions in 45-nm SOI CMOS, IEEE Journal of Solid-State Circuits, 2012, vol. 47, No. 12.

* cited by examiner

US 10,721,102 B2

COMMUNICATION APPARATUS AND COMMUNICATION METHOD

CROSS-REFERENCE TO RELATED APPLICATION

This application claims priority to Taiwan Application Serial Number 106129204, filed Aug. 28, 2017, which is herein incorporated by reference.

BACKGROUND

Technical Field

The present disclosure relates to a communication apparatus and a method for receiving signals. More particularly, the present disclosure relates to an apparatus and a method for reducing interference in a communication system.

Description of Related Art

In digital communication systems, intersymbol interference (IR) is a common issue in the signal transmission progress. The ISI is caused from the interference between the successive signal signs.

In high speed transmission interfaces, if the characteristic of the transmission channel (e.g., the length, the impedance, and/or the inductance of the transmission line) is known, the ISI may be compensated. However, in practical applications, the characteristic of the transmission channel cannot be estimated or known, the compensation cannot be effectively performed. As a result, the communication between the transmitter and the receiver may not be correct, and the signal quality may be reduced.

SUMMARY

In some aspects, the disclosure provides a communication apparatus. The communication apparatus includes an input terminal, an output terminal, and an interference reduction circuit. The input terminal is configured to receive a time-varying data signal. The interference reduction circuit is coupled between the input terminal and the output terminal. The interference reduction circuit is configured to acquire first partial data, at a first time, of the data signal and to generate a first level-shifted result and a second level-shifted result according to the first partial data. The interference reduction circuit is further configured to acquire second partial data, at a second time, of the data signal, and to select one of the first level-shifted result and the second level-shifted result as a selected result according to the second partial data, and to transmit the selected result to the output terminal.

In some aspects, the disclosure provides a communication method that includes following operations: receiving a time-varying data signal; acquiring first partial data, at a first time, of the data signal, and generating a first level-shifted result and a second level-shifted result according to the first partial data; acquiring second partial data, at a second time, of the data signal; and selecting one of the first level-shifted result and the second level-shifted result as a selected result, and transmitting the selected result to an output terminal.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DE TAILED DESCRIPTION

Figure 1:
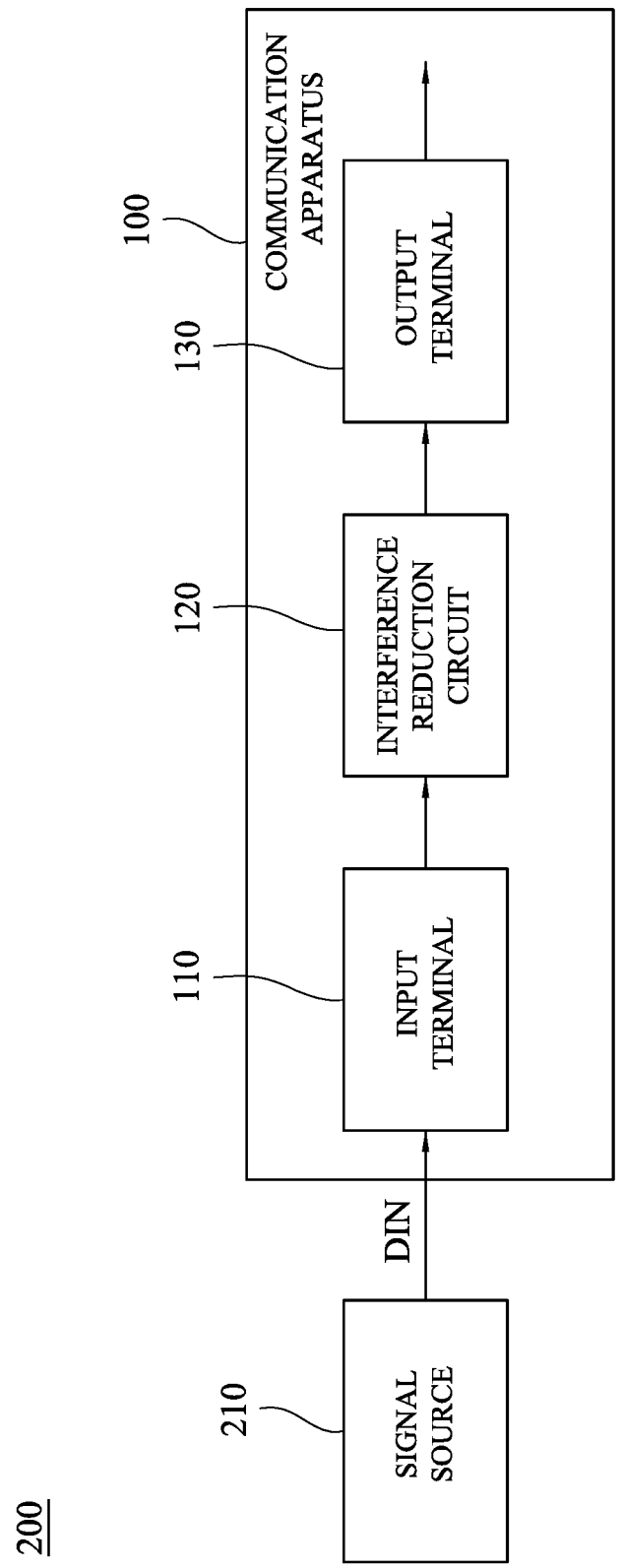
FIG. 1 is a schematic diagram of a communication system, according to some embodiments of the present disclosure.

FIG. 1 is a schematic diagram of a communication system 200, according to some embodiments of the present disclosure. The communication system 200 includes a signal source 210 and a communication apparatus 100. The communication apparatus 100 receives a data signal DIN transmitted from the signal source 210. In some embodiments, the data signal DIN is an analog signal that is time-varying and serialized.

The communication apparatus 100 includes an input terminal 110, an interference reduction circuit 120, and an output terminal 130. The interference reduction circuit 120 is coupled between the input terminal 110 and the output terminal 130. The input terminal 110 receives the time-varying data signal DIN. In some embodiments, the input terminal 110 includes a linear equalizer (not shown). The linear equalizer performs a preliminary processing on the data signal DIN, in order to adjust signal strength of the data signal DIN at each band. In some embodiments, the output terminal 130 includes a deserializer (not shown). The deserializer deserializes the data signal DIN received by the communication apparatus 100, in order to output the deserialized signals to other circuits.

Figure 2:
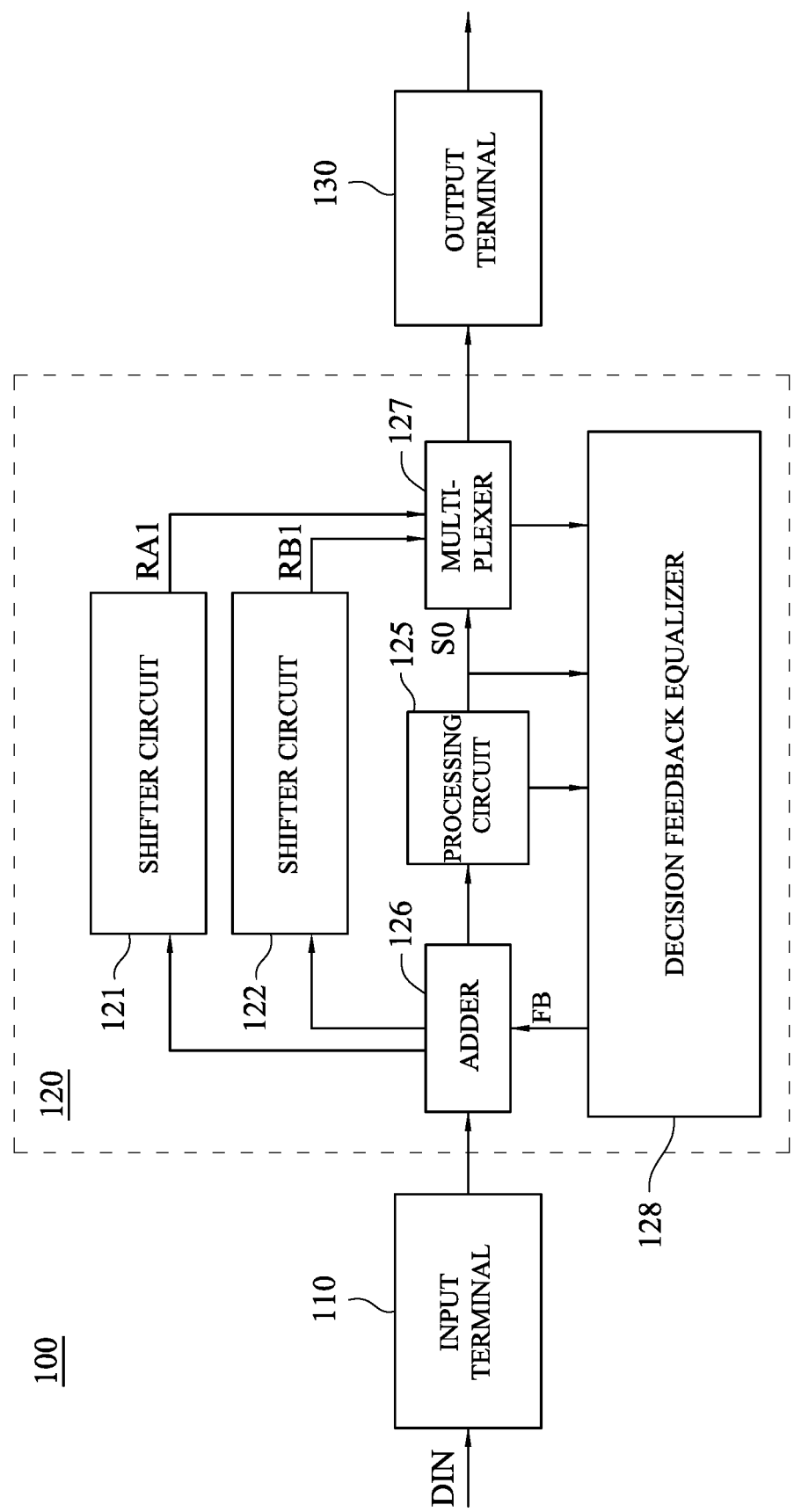
FIG. 2 is a functional block diagram of the communication apparatus, according to some embodiments of the present disclosure.

Reference is also made to FIG. 2. FIG. 2 is a functional block diagram of the communication apparatus 100, according to some embodiments of the present disclosure. The interference reduction circuit 120 includes shifter circuits 121 and 122, a processing circuit 125, an adder 126, and a multiplexer 127. In some embodiments, certain interferences (e.g., intersymbol interference) may present in data levels, at different timings, of the data signal DIN during a transmission progress from the signal source 210 to the communication apparatus 100. In some embodiments, the interference reduction circuit 120 is configured to reduce the interference of the data signal DIN at different timings.

A partial data, at a first time, of the data signal DIN is transmitted to the shifter circuits 121 and 122 via the adder 126. The shifter circuit 121 sums up the partial data at the first time and a first shift to generate a level-shifted result RA1. The shifter circuit 122 sums up the partial data at the first time and a second shift to generate a level-shifted result RB1.

After the first time, the processing circuit 125 acquires a partial data, at a second time, of the data signal DIN. In some embodiments, a sampling unit time interval (which may be 0.5 ms, 1 ms, or be set according to practical requirements) is present between the first time and the second time, but the present disclosure is not limited thereto. The partial data, at the second time, of the data signal DIN may be different from the partial data at the first time. The partial data at the first time and the partial data at the second time may have different voltage levels, and/or may carry the same information or different information. In some embodiments, a delay of the sampling unit time interval is caused during the shifter circuits 121 and 122 generate the level-shifted results RA1 and RB1 according the partial data at the first time, respectively, but the present disclosure is not limited thereto.

In some embodiments, a difference between the first time and the second time is one sampling unit time interval, and the level-shifted results RA1 and RB1 are delayed by one sampling unit time interval when compared with the partial data at the first time. The processing circuit 125 outputs a selection signal S0 according to the partial data at the second time. The level-shifted results RA1 and RB1 and the selection signal S0 are transmitted to the multiplexer 127 at the same time. The multiplexer 127 selects one of the level-shifted results RA1 and RB1 as a selected result according to the selection signal S0, and transmits the selected result to the output terminal 130. In other words, the partial data at the first time is adjusted to be the level shifted results RA1 and RB1. The level-shifted result RA1 or RB1 is then selected according to the partial data at the second time. As a result, the input voltage level of the previous data signal DIN (e.g., data signal DIN at the first time) can be adjusted according to the subsequent data signal DIN (e.g., data signal DIN at the second time). With this adjustment, the interference from subsequent signs to the previous signs can be compensated, and precursor ISI is able to be reduced.

Figure 3A:
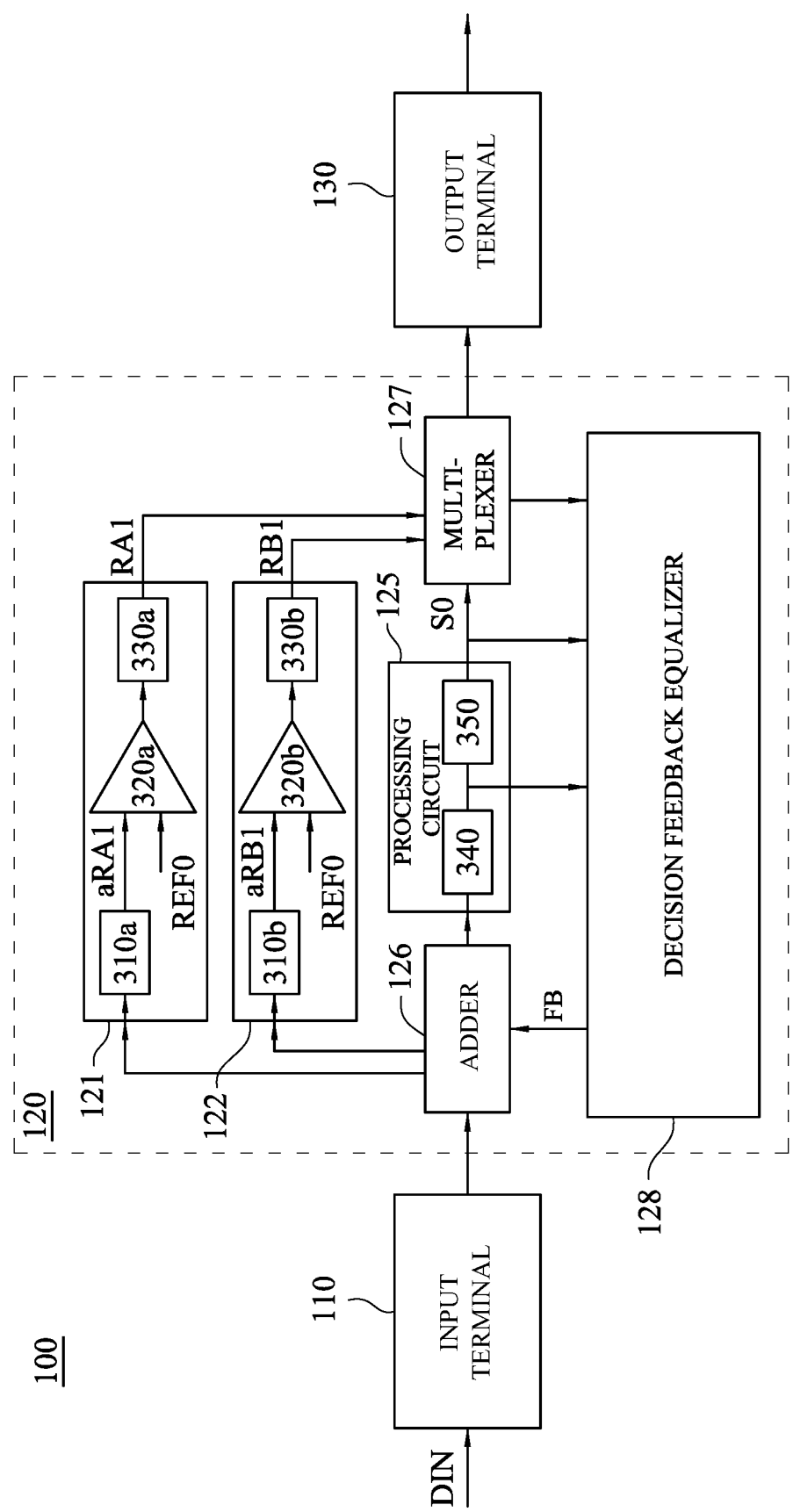
FIG. 3A is a circuit diagram of the communication apparatus in FIG. 2, according to some embodiments of the present disclosure.

FIG. 3A is a circuit diagram of the communication apparatus 100 in FIG. 2, according to some embodiments of the present disclosure. As shown in FIG. 3A, the shifter circuit 121 includes a level shifter 310a, a comparator 320a, and a delay circuit 330a. The level shifter 310a is configured to shift the partial data of the data signal DIN by a first predetermined voltage difference. For example, the partial data at the first time is shifted up by a voltage difference Vth and outputted as an analog level-shifted signal aRA1. Accordingly, the first predetermined voltage difference is +Vth, and the voltage level of the analog level-shifted signal aRA01 is equal to DIN+Vth. The comparator 320a compares the analog level-shifted signal aRA1 with a predetermined value REF0, in order to output a digitized level-shifted signal. The digitized level-shifted signal is outputted as the level-shifted result RA1 to the multiplexer 127 via the delay circuit 330a. In some embodiments, the predetermined value REF0 is a value for distinguishing between a high level (i.e., logic value of 1) and a low level (i.e., logic value of 0) of the digitized signal. If the voltage level of the analog level-shifted signal aRA1 is higher than the predetermined value REF0, the level-shifted result RA1 is the high level (i.e., the logic value of 1). If the voltage level of the analog level-shifted signal aRA1 is lower than the predetermined value REF0, the level-shifted result RA1 is the low level (i.e., the logic value of 0).

The shifter circuit 122 includes a level shifter 310b, a comparator 320b, and a delay circuit 330b. The level shifter 310b is configured to shift partial data of the data signal DIN by a second predetermined voltage difference. For example, the partial data at the first time is shifted down by the voltage difference Vth and outputted as an analog level-shifted signal aRB1. Accordingly, the second predetermined voltage difference is −Vth, and the voltage level of the analog level-shifted signal aRB1 is equal to DIN−Vth. The comparator 320b compares the analog level-shifted signal aRB1 with the predetermined value REF0, in order to output a digitized level-shifted signal. The digitized level-shifted signal is outputted as the level-shifted result RB1 via the delay circuit 330b to the multiplexer 127.

In some embodiments, a delay time introduced from the delay circuits 330a and 330b may be one sampling unit time interval or an integral multiple of the sampling unit time interval.

As described above, the level-shifted results RA1 and RB1 are different level-shifted results which are generated by increasing and decreasing the voltage from an initial level of the partial data at the first time, respectively. Therefore, if the interference reduction circuit 120 determines that the partial data at the second time may increase the partial data at the first time (i.e., a raised ISI is introduced to the partial data at the first time), the level-shifted result RB1 is selected. Otherwise, if the interference reduction circuit 120 determines that the partial data at the second time may reduce the partial data at the first time (i.e., a lowered ISI is introduced to the partial data at the first time), the level-shifted result RA1 is selected. With this selection, the impacts, introduced from the subsequent partial data, on the previous partial data are able to be removed or reduced.

The processing circuit 125 is coupled to the input terminal 110. In the embodiments of FIG. 3A, the processing circuit 125 includes a comparator 340 and a delay circuit 350. The multiplexer 127 is coupled to the processing circuit 125 and the shifter circuits 121 and 122, and is configured to select one of the level-shifted results RA1 and RB1, and to output the selected result to the output terminal 130.

In some embodiments, the comparator 340 is configured to compare the partial data with a threshold value, in order to generate the selection S0. The threshold value is set according to a characteristic of the data signal DIN. For example, if the characteristic of the data signal DIN corresponds to a binary signal and the binary signal is indicated as a transition between a high level (e.g., 1V) and a low level (e.g., −1V or 0V), the threshold value may be set as an average level between the high level and the low level (e.g., 0V or 0.5V). In some embodiments, if the data signal DIN is lower than the threshold value, the multiplexer 127 outputs the level-shifted result RA1 in response to the selection signal S0. On the other hand, if the data signal DIN is higher than the threshold value, the multiplexer 127 outputs the level-shifted result RB1 in response to the selection signal S0. In some embodiments, the threshold value and the selection between the level-shifted results RA1/RB1 may be determined according to a characteristic of the ISI of the data signal DIN.

In some embodiments, the delay time introduced from the delay circuit 350 is less than the delay time introduced from the delay circuit 330a by one sampling unit time interval. If the delay time introduced from the delay circuit 330a or from the delay circuit 330b are N sampling unit time intervals, the delay time introduced from the delay circuit 350 is (N−1) sampling unit time intervals. In addition, if N equals to 1, the delay time introduced from the delay circuit 350 is set to be zero, or no delay circuit 350 is employed in the processing circuit 125. The partial data at the second time, of the data signal DIN is outputted as the digitized partial data by the comparator 340. This partial data at the second time is digitized as the selection signal S0 which is then inputted to the multiplexer 127. It is noted that, in FIG. 3A, the selection S0 is labeled at the output of the delay circuit 350 is for ease of illustrating operations of the multiplexer 127 (i.e., timing synchronization).

A decision feedback equalizer 128 is coupled to the processing circuit 125 and the multiplexer 127, and is configured to generate a feedback signal FB according to the partial data (e.g., the partial data at the second time) and the selected result. In some embodiments, the decision feedback equalizer 128 is configured to generate the feedback signal FB according to the selection signal S0 corresponding to the partial data and the selected result. The adder 126 is coupled to the input terminal 110, the decision feedback equalizer 128, the shifter circuits 121 and 122, and the processing circuit 125. The adder 126 receives the feedback signal FB to adjust subsequent partial data of the data signal DIN.

The decision feedback equalizer 128 is configured to gather information of the previous level (e.g., the level at the second time) of the data signal DIN, and to feedback the same to the adder 126 correspondingly, in order to adjust the subsequent input voltage level of the data signal DIN. With this adjustment, the interference from the previous signs to subsequent signs can be compensated, and postcursor ISI is able to be reduced.

Figure 4:
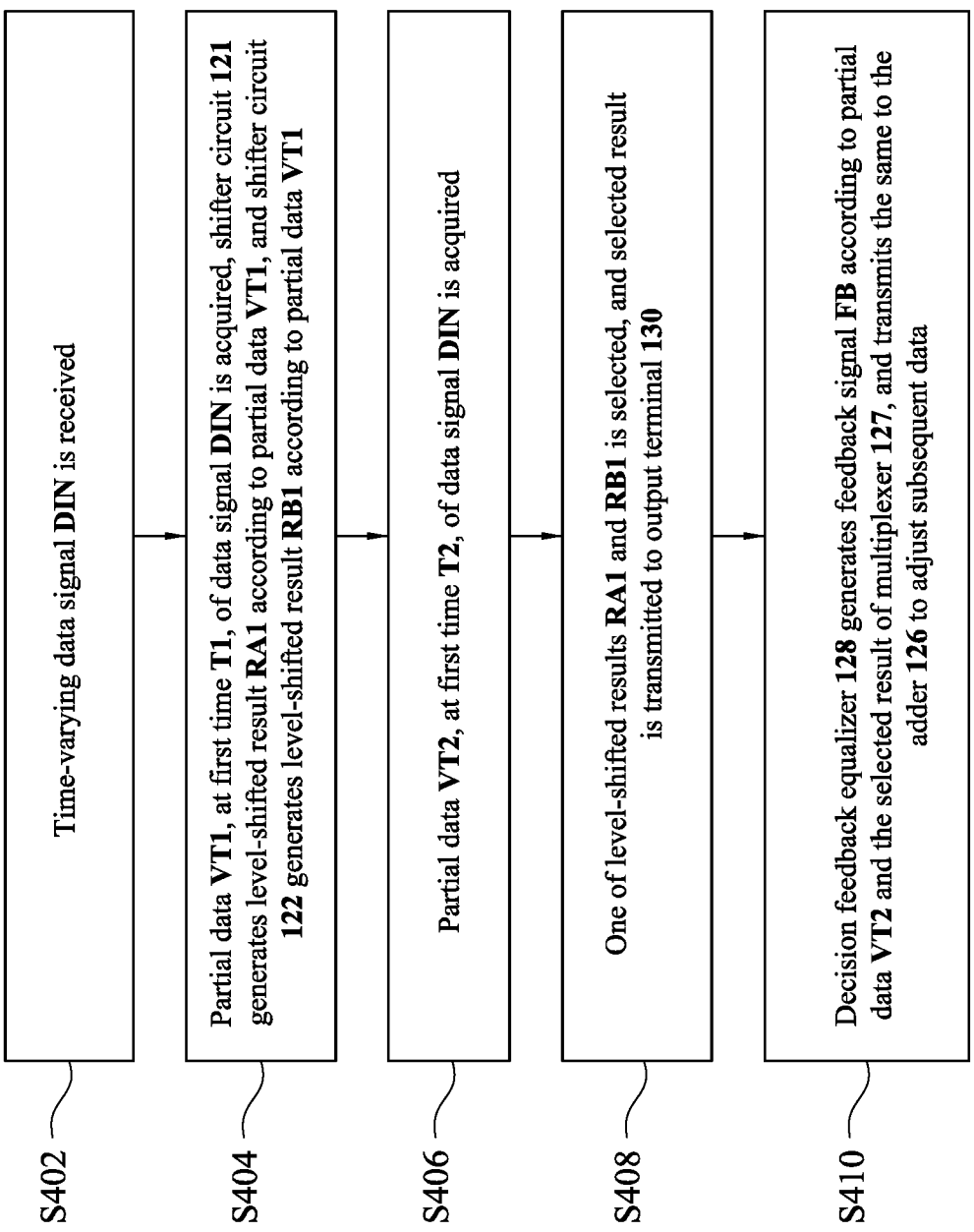
FIG. 4 is a flow chart of a communication method, according to some embodiments of the present disclosure.
Figure 5:
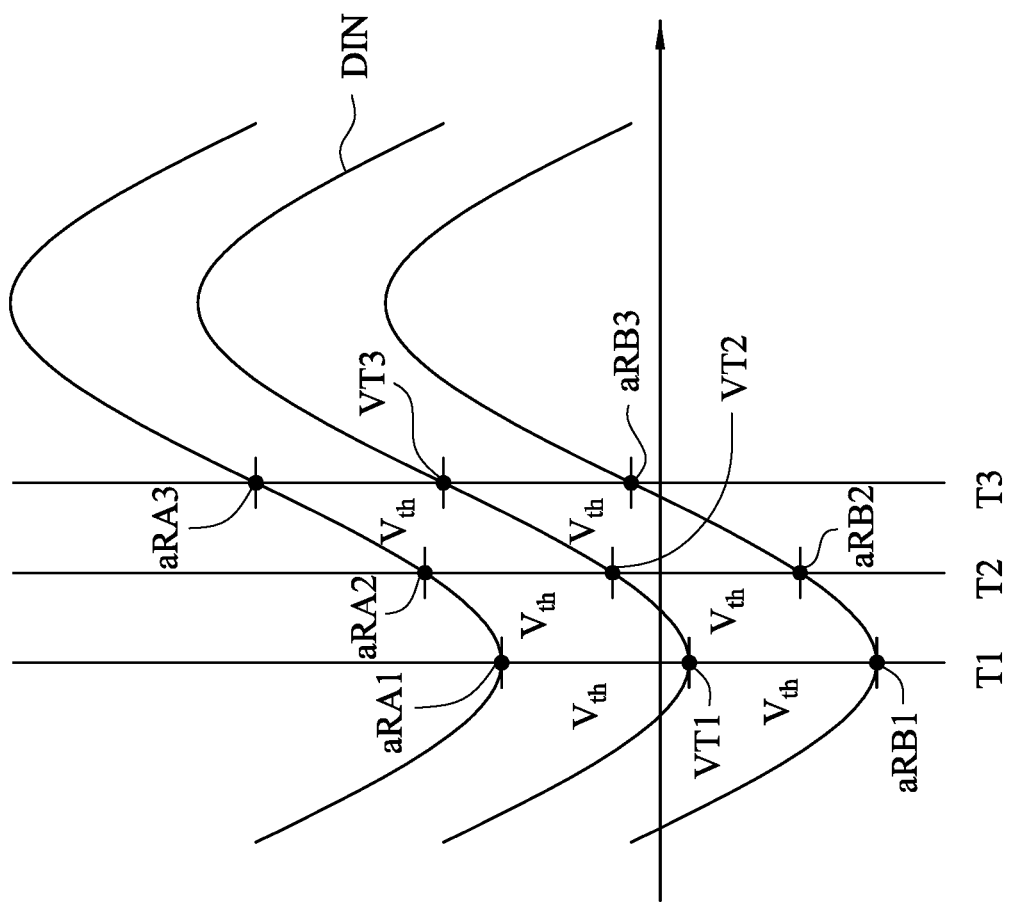
FIG. 5 is a schematic diagram illustrating the data signal processed by the interference reduction circuit, according to some embodiments of the present disclosure.

Reference is made to FIGS. 2, 3A, 4, and 5. FIG. 4 is a flow chart of a communication method 400, according to some embodiments of the present disclosure. FIG. 5 is a schematic diagram illustrating the data signal DIN processed by the interference reduction circuit 120, according to some embodiments of the present disclosure. The communication method 400 may be implemented with the following operations. In operation S402, the time-varying data signal DIN is received. In operation S404, partial data VT1, at a first time T1, of the data signal DIN is acquired, the shifter circuit 121 generates the level-shifted result RA1 according to the partial data VT1, and the shifter circuit 122 generates the level-shifted result RB1 according to the partial data VT1.

As shown in FIG. 5, at the time T1, the partial data VT1 of the data signal DIN is transmitted to the shifter circuits 121 and 122 via the adder 126. The shifter circuit 121 sums up the partial data VT1 and a first shift (which may be +Vth in some embodiments), in order to generate the analog level-shifted signal aRA1, and the shifter circuit 122 sums up the partial VT1 and a second shift (which may be −Vth in some embodiments), in order to generate the analog level-shifted signal aRB1. The analog level-shifted signals aRA1 and aRB1 are then processed by the comparators 320a and 320b in FIG. 3A and the delay circuits 330a and 330b, respectively, in order to be the digitalized level-shifted results RA1 and RB1.

In operation S406, after the first time T1, partial data VT2, at a second time T2, of the data signal DIN is acquired.

In operation S408, one of the level-shifted results RA1 and RB1 is selected, and the selected result is transmitted to the output terminal 130. Under this condition, the output terminal 130 considers the one of the level-shifted results RA1 and RB1 as the data, at the first time T1, of the data signal DIN.

In operation S410, the decision feedback equalizer 128 generates the feedback signal FB according to the partial data VT2 and the selected result of the multiplexer 127, and transmits the same to the adder 126 to adjust subsequent data (e.g., partial data VT3 at a third time T3). In some embodiments, the decision feedback equalizer 128 generates the feedback signal FB according to the selection signal S0 (which corresponds to the partial data VT2) and the selected result of the multiplexer 127.

In other words, the decision feedback equalizer 128 may generate the feedback signal FB based on the previously-received data, which may be, for example, the received selection signal S0 (which corresponds to the second time T2) and the selected result (which corresponds to the first time T1), in order to adjust subsequent data (e.g., the partial data VT3 at the third time T3). Accordingly, the decision feedback equalizer 128 is able to be employed to reduce the postcursor ISI.

The first shift and the second shift may be voltage having the same value but with different signs. For example, the first shift may be a positive voltage difference +Vth, and the second shift may be a negative voltage difference −Vth. The arrangements of the shifts are given for illustrative purposes, and the present disclosure is not limited thereto. By selecting one of the level-shifted results RA1 and RB1 as correct data at the first time according to subsequent signals, impacts from channel noises can be reduced, and the impacts of the ISI on the signal quality can be compensated. In some embodiments, an absolute value of the voltage difference Vth, as used in the first and the second shift, can be obtained by using a least mean square algorithm, but the present disclosure is not limited thereto.

It is noted that, the interference reduction circuit 120 performs the compensation over time. In other words, the interference reduction circuit 120 may repeatedly perform operations S404 to S410 in FIG. 4. As far as the second time T2 is concerned, the partial data VT2, at the second time T2, of the data signal DIN is acquired and transmitted to the shifter circuits 121 and 122 via the adder 126. The shifter circuit 121 is configured to sum up the partial data VT2 and the first shift (which may be +Vth in some embodiments), in order to generate the level-shifted result RA2 (which corresponds to aRA2), and the shifter circuit 122 is configured to sum up the partial data VT2 at the second time and the second shift (which may be −Vth in some embodiments), in order to generate the level-shifted result RB2 (which corresponds to aRB2).

In operation S406, after the second time T2, partial data VT3, at a third time T3, of the data signal DIN is acquired. In operation S408, one of the level-shifted results RA2 and RB2 is selected according to the partial data VT3, and the selected result is transmitted to the output terminal 130. The output terminal 130 then considers one of the level-shifted results RA2 and RB2 as the data, at the second time T2, of the data signal DIN.

In operation S410, the decision feedback equalizer 128 receives the partial data VT3 and the selected result (e.g., the level-shifted result RA2 or RB2) of the multiplexer 127, and generates the feedback signal FB according to the partial data VT3 and the selected result. The adder 126 receives the feedback signal FB. By transmitting the data back to the adder 126, subsequent data (e.g., a fourth partial data (not shown) or partial data sampled at subsequent times) is able to be adjusted.

Figure 3B:
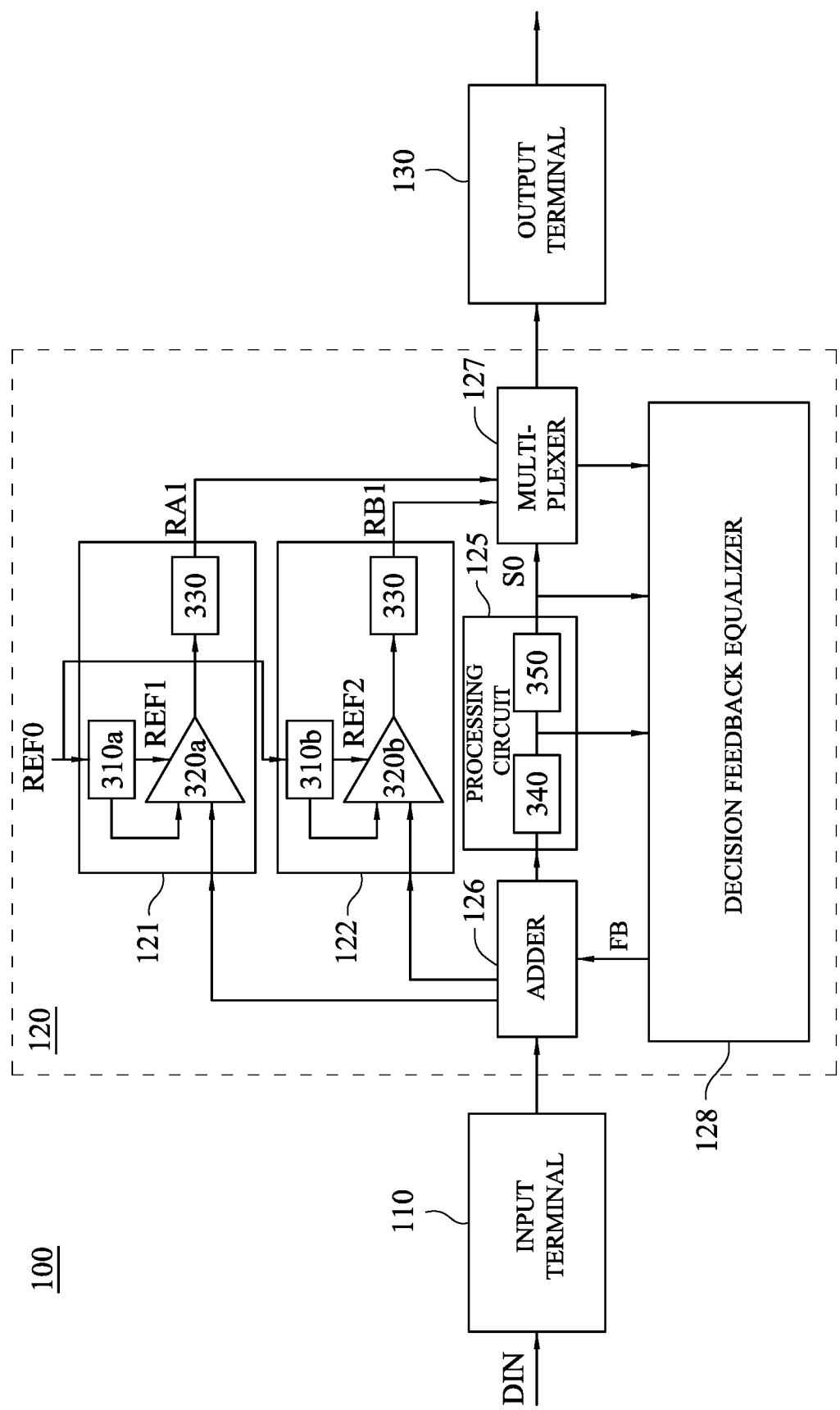
FIG. 3B is a circuit diagram of the communication apparatus in FIG. 2, according to some embodiments of the present disclosure.

Reference is made to FIG. 3B. FIG. 3B is a circuit diagram of the communication apparatus 100 in FIG. 2, according to some embodiments of the present disclosure. The operations of the communication method 400 may be performed by the circuit shown in FIG. 3B, in order to achieve the similar results. Compared with FIG. 3A, in the shifter circuits 121 and 122 in FIG. 3B, the level shifters 310*a* and 310*b* sum up the predetermined value REF0 with the first shift and sum up the predetermined value REF0 with the second shift, respectively, in order to generate reference signals REF1 and REF2. The reference signals REF1 and REF2 are then compared with the partial data VT1, by the comparators 320*a* and 320*b* respectively, to generate the digitized level-shifted signals. These digitized level-shifted signals are then processed by the delay circuits 330*a* and 330*b* to generate the level-shifted results RA1 and RB1 to the multiplexer 127, and the output of the multiplexer 127 is sent to the decision feedback equalizer 128 to adjust the subsequent partial data. In the embodiments of FIG. 3B, each of the first shift and the second shift is summed up with the predetermined value, in order to generate different reference signals REF1 (which equals to REF+Vth) and REF2 (which equals to REF0−Vth). By comparing the same partial data VT1 with the different reference signals REF1 and REF2, the digitized results RA1 and RB1 can be obtained.

Figure 6:
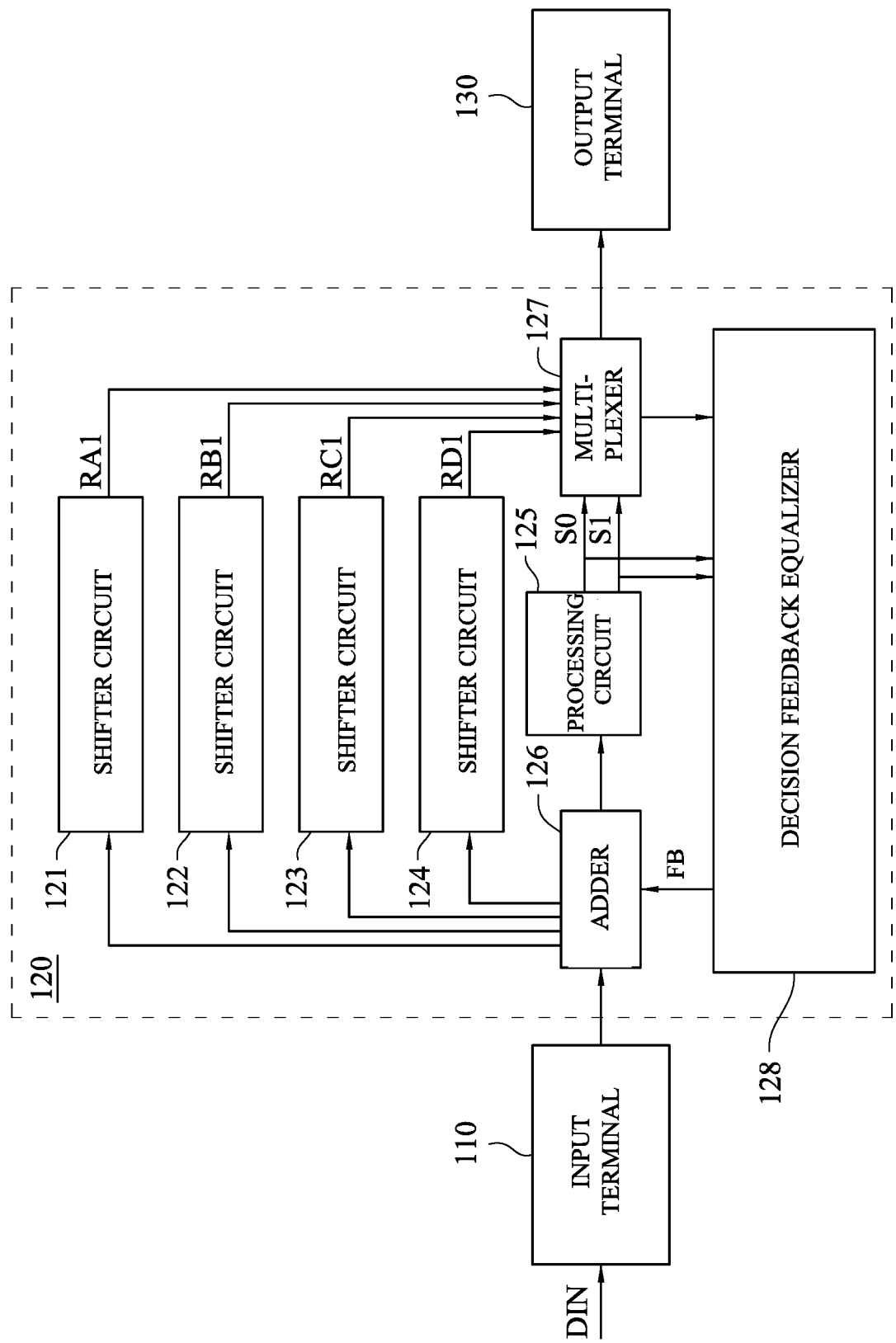
FIG. 6 is a functional block diagram of a communication apparatus, according to some other embodiments of the present disclosure.
Figure 7:
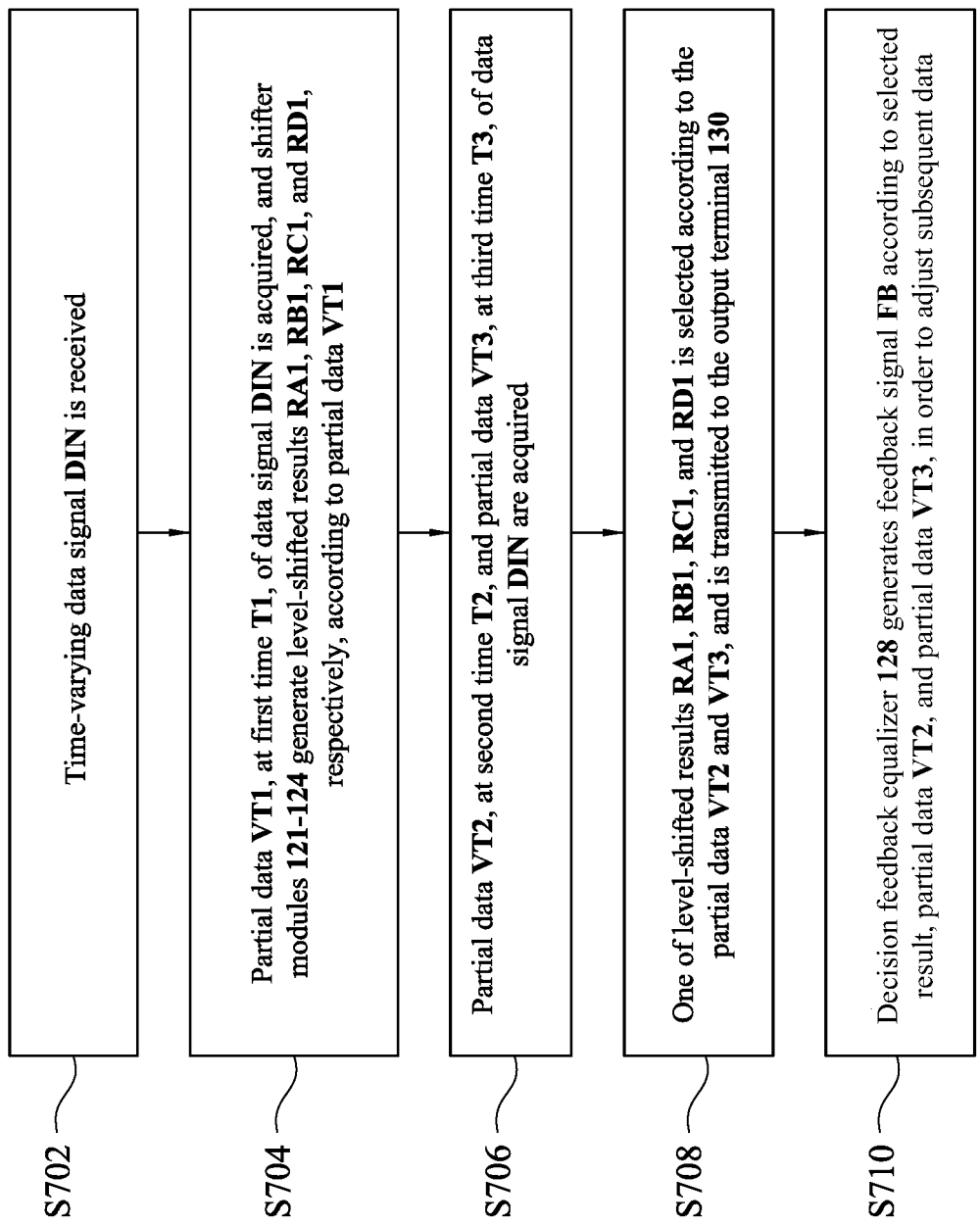
FIG. 7 is a flow chart of a method, according to some embodiments of the present disclosure.
Figure 8:
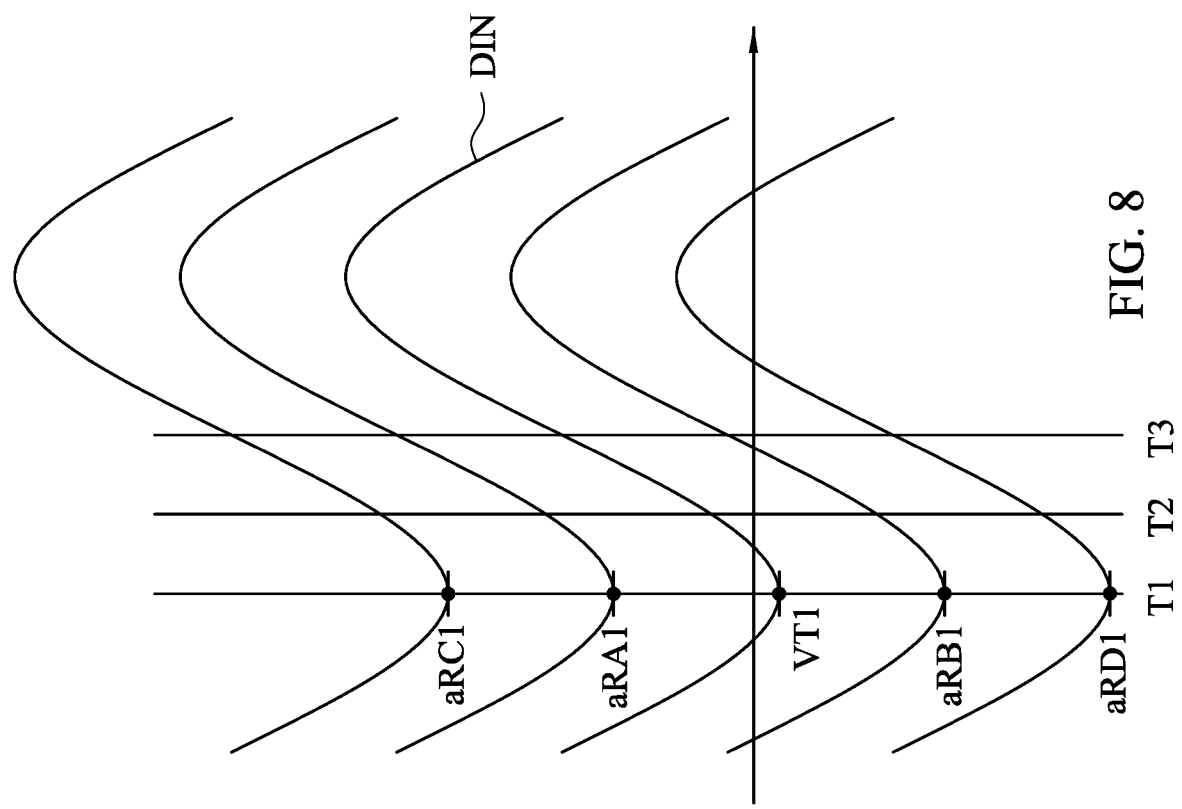
FIG. 8 is a schematic diagram illustration signals processed by the method in FIG. 7, according to some embodiments of the present disclosure.

Reference is made to FIGS. 6-8. FIG. 6 is a functional block diagram of a communication apparatus, according to some other embodiments of the present disclosure. Except including the shifter circuits 121 and 122 shown in FIGS. 2, 3A, or 3B, the interference reduction circuit 120 further includes shifter circuits 123 and 124. FIG. 7 is a flow chart of a method, according to some embodiments of the present disclosure. FIG. 8 is a schematic diagram illustration signals processed by the method in FIG. 7, according to some embodiments of the present disclosure.

In operation S702, the time-varying data signal DIN is received.

In operation S704, the partial data VT1, at the first time T1, of the data signal DIN is acquired, and the shifter circuits 121-124 generate level-shifted results RA1, RB1, RC1, and RD1, respectively, according to the partial data VT1. In greater details, the shifter circuits 121-124 provide different shifts to the partial data VT1. Level shifters 310*a*-310*d* of the shifter circuits 121-124 generates analog level-shifted signals aRA1, aRB1, aRC1, and aRD1, and comparators 320*a*-320*d* and delay circuits 330*a*-330*d* generate level-shifted results RA1, RB1, RBC, and RD1. Similar to operations shown in FIG. 4, in some embodiments, in operation S704, analog shifted signals aRA1, aRB1, aRC1, and aRD1, which are generated by summing different shifts, are compared with the reference value to obtain level-shifted results RA1, RB1, RC1, and RD1. In some other embodiments, the predetermined value is summed up with different shifted voltages, and the partial data VT1 is then compared with the shifted predetermined values to generate the level-shifted results RA1, RB1, RC1, and RD1.

In some embodiments of FIG. 8, the analog level-shifted signal aRA1 is the partial data VT1 plus a predetermined shifted voltage, the analog level-shifted signal aRC1 is the partial data VT1 plus two times of the predetermined shifted voltage, the analog level-shifted signal aRB1 is the partial data VT1 minus the predetermined shifted voltage, and the analog level-shifted signal aRD1 is the partial data VT1 minus two times of the predetermined shifted voltage, but the present disclosure is not limited thereto.

In some embodiments, the analog level-shifted signal aRA1 and the analog level-shifted signal aRB1 may have the same shifted value (or voltage) but with different signs. In some embodiments, the analog level-shifted signal aRC1 and the analog level-shifted signal aRD1 may have the same shifted value (or voltage) but with different signs. In some embodiments, the shifted values of analog level-shifted signals aRA1 and aRB1 and those of the analog level-shifted signals aRC1 and aRD1 may not be proportional. The above examples of the analog level-shifted signals aRA1-aRD1 are given for illustrative purposes, and various configurations of analog level-shifted signals aRA1-aRD1, which are able to be applied to the communication apparatus 100, are within the contemplated scope of the present disclosure.

In some embodiments, the shift and direction of the analog level-shifted signals aRA1, aRB1, aRC1, and aRD1 may be determined based on the characteristic of the ISI of the data signal DIN. For example, if the characteristic of the precursor ISI of the data signal DIN tends to lower the previous data signal, the shifted direction of the analog level-shifted signals aRA1, aRB1, aRC1, and aRD1 is set to be an increment (i.e., plus different shifted voltages), or the shifted direction of the analog level-shifted signals aRA1, aRB1, and aRC1 is set to be the increment while the shifted direction of the analog level-shifted signal aRD1 is set to be a decrement. Alternatively, if the precursor ISI of the data signal DIN tends to increase the previous data signal, the shifted direction of the analog level-shifted signals aRA1, aRB1, aRC1, and aRD1 is set to be a decrement (i.e., minus different shifted voltages), or the shifted direction of the analog level-shifted signals aRA1, aRB1, and aRC1 is set to be the decrement while the shifted direction of the analog level-shifted signal aRD1 is set to be an increment.

In operation S706, the processing circuit 125 further acquires the partial data VT2, at the second time T2, and the partial data VT3, at the third time T3, of the data signal DIN, in order to generate the selection signals S0 and S1 to the multiplexer 127 for decision. In some embodiments, the processing circuit 125 may compare the partial data VT2 with a first threshold value to generate the selection signal S0, and compare the partial data VT2 with a second threshold value to generate the selection signal S1, in which the first and second threshold values may be set according to the characteristic of the data signal DIN and may be the same value or different values.

In operation S708, the multiplexer 127 further selects one of the level-shifted results RA1, RB1, RC1, and RD1, which correspond to the partial data VT1, according to the selection signals S0 and S1, and transmits the selected result to the output terminal 130.

In some embodiments, the shifter circuits 123 and 124 may be implemented with the same architecture of the shifter circuit 121. The remaining operations in FIG. 6 are similar to FIG. 2, and thus the repetitious descriptions are not given herein.

In operation S710, the decision feedback equalizer 128 generates the feedback signal FB according to the selected result, the partial data VT2, and the partial data VT3, in order to adjust subsequent data. In some embodiments, the decision feedback equalizer 128 may receive the selection signal S0 (which corresponds to the partial data VT2), the selection signal S1 (which corresponds to the partial data VT3), and the selected result, in order to generate the feedback signal FB.

Figure 9:
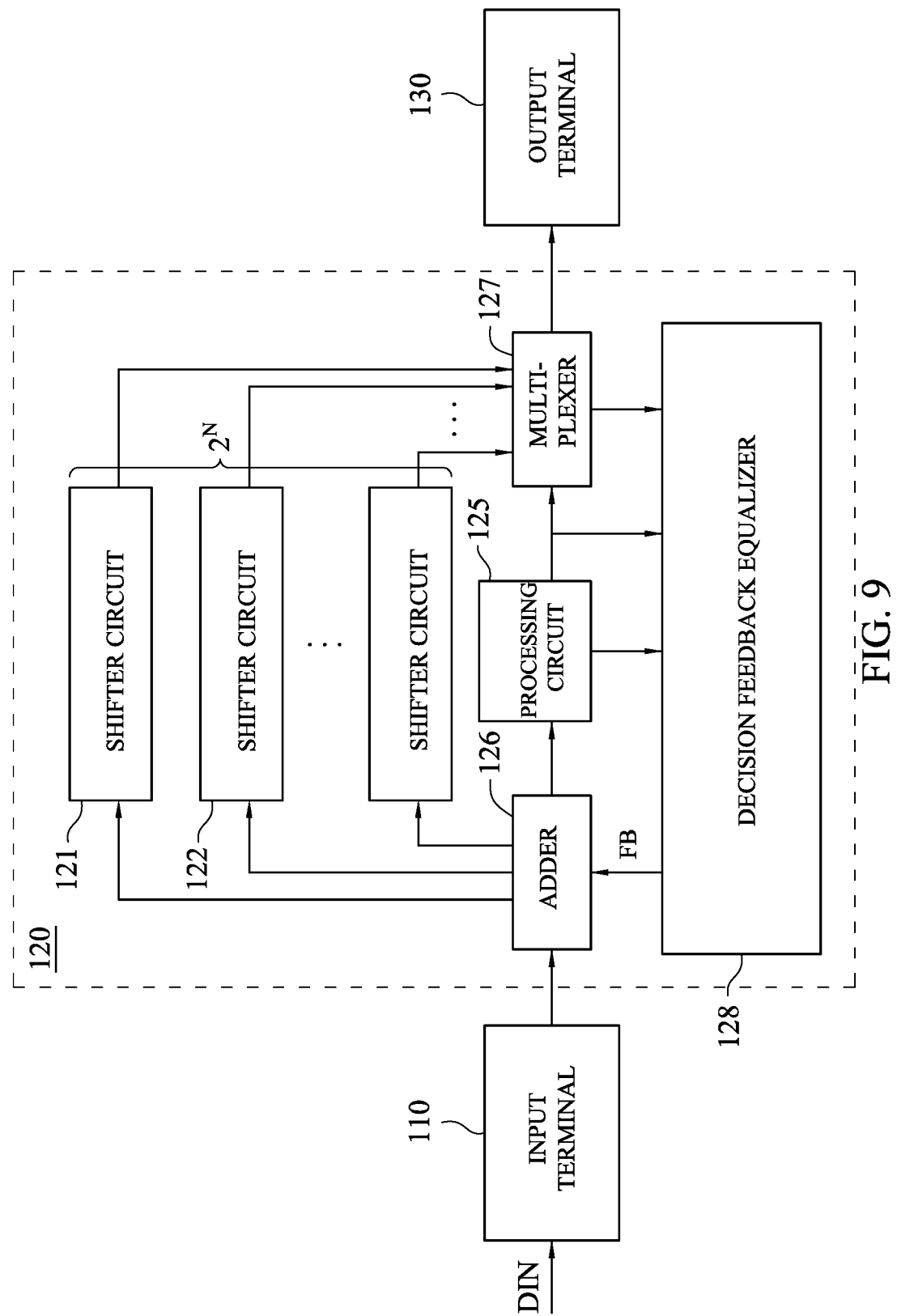
FIG. 9 is a functional block diagram of a communication apparatus, according to some embodiments of the present disclosure.

FIG. 9 is a functional block diagram of a communication apparatus 100, according to some embodiments of the present disclosure. FIG. 9 is a general case having $2^N$ shifter circuits, and this case is able to be derived from FIG. 2 and FIG. 6 of the present case, in which N is a positive integer. The operations and the arrangements shown in FIG. 9 are similar to FIG. 2 and FIG. 6, and thus the repetitious descriptions are not further given herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A communication apparatus, comprising:
    an input terminal configured to receive a time-varying data signal;
    an output terminal; and
    an interference reduction circuit coupled between the input terminal and the output terminal, the interference reduction circuit configured to acquire first partial data, at a first time, of the data signal and to generate a first level-shifted result and a second level-shifted result according to the first partial data,
    wherein the interference reduction circuit is further configured to acquire second partial data, at a second time, of the data signal, to generate a selection signal based on the second partial data, and to select one of the first level-shifted result and the second level-shifted result as a selected result according to the selection signal, and to transmit the selected result to the output terminal, wherein the second time when the second partial data is acquired for generating the selection signal is after the first time when the first partial data is acquired for generating the first level-shifted result and the second level-shifted result.

2. The communication apparatus of claim 1, wherein the interference reduction circuit comprises:
    a first shifter circuit configured to sum up the first partial data and a first shift, in order to generate the first level-shifted result; and
    a second shifter circuit configured to sum up the first partial data and a second shift, in order to generate the second level-shifted result.

3. The communication apparatus of claim 2, wherein each of the first shifter circuit and the second shifter circuit comprises:
    a level shifter configured to sum up the first partial data and the first shift or the second shift;
    a comparator configured to compare the first partial data processed by the level shifter with a predetermined value, in order to generate a digitized shifted signal; and
    a delay circuit configured to delay the digitized shifted signal to generate the first level-shifted result or the second level-shifted result.

4. The communication apparatus of claim 2, wherein each of the first shifter circuit and the second shifter circuit comprises:
    a level shifter configured to sum up a predetermined value and the first shift or the second shift;
    a comparator configured to compare the first partial data with the predetermined value processed by the level shifter, in order to generate a digitized shifted signal; and
    a delay circuit configured to delay the digitized shifted signal to generate the first level-shifted result or the second level-shifted result.

5. The communication apparatus of claim 2, wherein the interference reduction circuit further comprises:
    a processing circuit coupled to the input terminal, the processing circuit configured to acquire the second partial data; and
    a multiplexer coupled to the processing circuit, the first shifter circuit, and the second shifter circuit, the multiplexer configured to select the one of the first level-shifted result and the second level-shifted result and to output the selected result.

6. The communication apparatus of claim 5, wherein the interference reduction circuit further comprises:
    a decision feedback equalizer coupled to the processing circuit and the multiplexer, the decision feedback equalizer configured to receive the second partial data and the selected result, and to generate a feedback signal according to the second partial data and the selected result; and
    an adder coupled to the input terminal, the decision feedback equalizer, the first shifter circuit, the second shifter circuit, and the processing circuit, the adder configured to receive the feedback signal to adjust third partial data, at a third time, of the data signal.

7. The communication apparatus of claim 1, wherein the interference reduction circuit is further configured to generate a third level-shifted result and a fourth level-shifted result according to the first partial data, and to acquire a third partial data, at a third time, of the data signal, and to select one of the first level-shifted result, the second level-shifted result, the third level-shifted result, and the fourth level-shifted result as the selected result according to the second partial data and the third partial data.

8. A communication method, comprising:
    receiving a time-varying data signal;
    acquiring first partial data, at a first time, of the data signal, and generating a first level-shifted result and a second level-shifted result according to the first partial data;
    acquiring second partial data, at a second time, of the data signal, to generate a selection signal based on the second partial data; and
    selecting one of the first level-shifted result and the second level-shifted result as a selected result according to the selection signal, and transmitting the selected result to an output terminal, wherein the second time when the second partial data is acquired for generating the selection signal is after the first time when the first partial data is acquired for generating the first level-shifted result and the second level-shifted result.

9. The communication method of claim 8, wherein generating the first level-shifted result and the second level-shifted result comprising:
    generating the first level-shifted result according to the first partial data and a first shift; and
    generating the second level-shifted result according to the first partial data and a second shift.

10. The communication method of claim 9, wherein a summation of the first partial data and the first shift is compared with a predetermined value to obtain the first level-shifted result, and a summation of the first partial data and the second shift is compared with the predetermined value to obtain the second level-shifted result.

11. The communication method of claim 9, wherein the first partial data is compared with a summation of a predetermined value and the first shift to obtain the first level-shifted result, and the first partial data is compared with a summation of the predetermined value and the second shift to obtain the second level-shifted result.

12. The communication method of claim 8, further comprising:
inputting the selected result and the second partial data to a decision feedback equalizer, and adjusting third partial data, at a third time, of the data signal according to outputs of the decision feedback equalizer.

13. The communication method of claim 8, further comprising:
generating a third level-shifted result and a fourth level-shifted result, and acquiring a third partial data, at a third time, of the data signal; and
selecting one of the first level-shifted result, the second level-shifted result, the third level-shifted result, and the fourth level-shifted result as the selected result according to the second partial data and the third partial data, and transmitting the selected result to the output terminal.

14. A communication apparatus, comprising:
an input terminal configured to receive a time-varying data signal;
an output terminal; and
an interference reduction circuit coupled between the input terminal and the output terminal, the interference reduction circuit configured to acquire first partial data, at a first time, of the data signal and to generate a first level-shifted result and a second level-shifted result according to the first partial data,
wherein the interference reduction circuit is further configured to acquire second partial data, at a second time, of the data signal, and to select one of the first level-shifted result and the second level-shifted result as a selected result according to the second partial data, and to transmit the selected result to the output terminal, wherein the second time is after the first time,
wherein the interference reduction circuit is further configured to generate a third level-shifted result and a fourth level-shifted result according to the first partial data, and to acquire a third partial data, at a third time, of the data signal, and to select one of the first level-shifted result, the second level-shifted result, the third level-shifted result, and the fourth level-shifted result as the selected result according to the second partial data and the third partial data.

15. The communication apparatus of claim 14, wherein the interference reduction circuit comprises:
a first shifter circuit configured to sum up the first partial data and a first shift, in order to generate the first level-shifted result; and
a second shifter circuit configured to sum up the first partial data and a second shift, in order to generate the second level-shifted result.

16. The communication apparatus of claim 15, wherein each of the first shifter circuit and the second shifter circuit comprises:

a level shifter configured to sum up the first partial data and the first shift or the second shift;
a comparator configured to compare the first partial data processed by the level shifter with a predetermined value, in order to generate a digitized shifted signal; and
a delay circuit configured to delay the digitized shifted signal to generate the first level-shifted result or the second level-shifted result.

17. The communication apparatus of claim 15, wherein each of the first shifter circuit and the second shifter circuit comprises:
a level shifter configured to sum up a predetermined value and the first shift or the second shift;
a comparator configured to compare the first partial data with the predetermined value processed by the level shifter, in order to generate a digitized shifted signal; and
a delay circuit configured to delay the digitized shifted signal to generate the first level-shifted result or the second level-shifted result.

18. The communication apparatus of claim 15, wherein the interference reduction circuit further comprises:
a processing circuit coupled to the input terminal, the processing circuit configured to acquire the second partial data; and
a multiplexer coupled to the processing circuit, the first shifter circuit, and the second shifter circuit, the multiplexer configured to select the one of the first level-shifted result and the second level-shifted result and to output the selected result.

19. The communication apparatus of claim 18, wherein the interference reduction circuit further comprises:
a decision feedback equalizer coupled to the processing circuit and the multiplexer, the decision feedback equalizer configured to receive the second partial data and the selected result, and to generate a feedback signal according to the second partial data and the selected result; and
an adder coupled to the input terminal, the decision feedback equalizer, the first shifter circuit, the second shifter circuit, and the processing circuit, the adder configured to receive the feedback signal to adjust the third partial data, at the third time, of the data signal.

20. The communication apparatus of claim 14, wherein the interference reduction circuit is further configured to generate a first selection signal based on the second partial data and to generate a second selection signal based on the third partial data, and the interference reduction circuit is further configured to select one of the first level-shifted result, the second level-shifted result, the third level-shifted result, and the fourth level-shifted result as the selected result according to the first selection signal and the second selection signal.

* * * * *